US012744759B2

(12) United States Patent
Dale et al.

(10) Patent No.: US 12,744,759 B2
(45) Date of Patent: Sep. 22, 2026

(54) NETWORK FILTER

(71) Applicant: The Secretary of State for Foreign and Commonwealth Affairs, Cheltenham (GB)

(72) Inventors: Robert John Dale, Cheltenham (GB); Paul Thomas McCombes, Cheltenham (GB)

(73) Assignee: The Secretary of State for Foreign and Commonwealth Affairs, Cheltenham (GB)

( * ) Notice: Subject to any disclaimer, the term of this patent is extended or adjusted under 35 U.S.C. 154(b) by 84 days.

(21) Appl. No.: 17/598,580

(22) PCT Filed: Mar. 20, 2020

(86) PCT No.: PCT/GB2020/000031
§ 371 (c)(1),
(2) Date: Sep. 27, 2021

(87) PCT Pub. No.: WO2020/193930
PCT Pub. Date: Oct. 1, 2020

(65) Prior Publication Data

US 2022/0166754 A1 May 26, 2022

(30) Foreign Application Priority Data

Mar. 27, 2019 (GB) ..................................... 1904224

(51) Int. Cl.
*H04L 9/40* (2022.01)
*H04L 12/46* (2006.01)
(Continued)

(52) U.S. Cl.
CPC ...... *H04L 63/0245* (2013.01); *H04L 63/0272* (2013.01); *H04L 63/029* (2013.01);
(Continued)

(58) Field of Classification Search
None
See application file for complete search history.

(56) References Cited

U.S. PATENT DOCUMENTS 7,945,678 B1 * 5/2011 Skene ................ H04L 67/1001 709/227
8,316,435 B1 * 11/2012 Varadhan ............... H04L 45/60 726/2

(Continued)

OTHER PUBLICATIONS

Mockapetris; RFC 1035 Domain Names—Implementation and Specification; 1987; retrieved from the Internet https://www.ietf.org/rfc/rfc1035.txt; pp. 1-55, as printed. (Year: 1987).*

(Continued)

*Primary Examiner* — Michael W Chao
(74) *Attorney, Agent, or Firm* — Kilpatrick Townsend & Stockton LLP

(57) ABSTRACT

A data filter and a method of creating a network data pathway via a network filter is disclosed the method comprising a i. selection phase and ii. operation phase. The selection phase comprises transferring over a network at least one enquiry data packet between a first network user and at least one other network participant via the filter and receiving at least one enquiry data packet response from the at least one network participant via the filter. A network participant is selected so as to switch from the selection phase to the operation phase. The operation phase comprises creating a network data pathway between the first network user and the selected network participant and prohibiting further creation of a further network data pathway between the network user and any unselected network participant.

40 Claims, 5 Drawing Sheets

(51) Int. Cl.
*H04L 61/10* (2022.01)
*H04L 61/4511* (2022.01)

(52) U.S. Cl.
CPC ...... *H04L 12/4633* (2013.01); *H04L 12/4641* (2013.01); *H04L 61/10* (2013.01); *H04L 61/4511* (2022.05)

(56) References Cited

U.S. PATENT DOCUMENTS 8,627,422 B2 * 1/2014 Hawkes .............. H04L 63/0869 380/255
9,207,953 B1 * 12/2015 Shokhor ............... H04L 67/288
9,225,733 B1 12/2015 Hung et al.
9,560,015 B1 1/2017 Glazemakers et al.
10,938,855 B1 * 3/2021 Waldie .................. G06F 21/575
2003/0028650 A1 * 2/2003 Chen ................... H04L 12/4641 709/229
2003/0041136 A1 * 2/2003 Cheline ................... H04L 67/34 726/15
2005/0044237 A1 * 2/2005 Sitaraman ........... H04L 12/4641 709/227
2005/0180319 A1 * 8/2005 Hutnik ................ H04L 67/1021 370/237
2005/0193103 A1 * 9/2005 Drabik ................ H04L 63/0272 709/221
2005/0198532 A1 * 9/2005 Comlekoglu ........... H04L 63/08 726/22
2005/0277434 A1 * 12/2005 Tuomi ................ H04L 63/0428 455/509
2006/0070115 A1 * 3/2006 Yamada ................ H04L 63/164 726/3
2006/0143702 A1 * 6/2006 Hisada ................ H04L 12/4641 726/15
2006/0187854 A1 * 8/2006 Booth, III ........... H04L 12/4691 370/254
2007/0248085 A1 * 10/2007 Volpano .............. H04L 63/0272 370/389
2008/0022392 A1 * 1/2008 Karpati ................... H04L 63/20 726/15
2009/0158032 A1 * 6/2009 Costa .................. H04L 63/0823 380/270
2010/0299518 A1 * 11/2010 Viswanathan .......... H04L 9/083 713/153
2011/0013637 A1 * 1/2011 Xue ..................... G06Q 20/027 370/395.5
2012/0173683 A1 * 7/2012 Massam .................... H04L 9/40 709/221
2013/0166715 A1 * 6/2013 Yuan ................... H04L 61/4511 709/223
2013/0232554 A1 * 9/2013 Campagna ............ H04L 63/126 726/4
2013/0291086 A1 * 10/2013 Pontillo .............. H04L 63/0823 726/10
2013/0326609 A1 12/2013 Sharkey
2014/0109175 A1 * 4/2014 Barton ................ H04L 63/0807 726/1
2014/0201814 A1 * 7/2014 Barkie ................ H04L 63/0892 726/4
2014/0344917 A1 * 11/2014 Parla ....................... H04L 45/74 709/245
2014/0373090 A1 * 12/2014 Murgia ................ H04L 63/102 726/1
2015/0052595 A1 * 2/2015 Murphy ................. G06F 21/44 726/7
2015/0082419 A1 3/2015 Sharkey
2015/0215268 A1 * 7/2015 Dinha ................ H04L 63/0272 709/245
2016/0127306 A1 * 5/2016 Wang ................. H04L 61/4541 370/390
2016/0155112 A1 * 6/2016 Phillips ............. G06Q 20/3276 235/379
2016/0337104 A1 * 11/2016 Kalligudd ........... H04L 12/4641
2017/0142072 A1 * 5/2017 Reubenstein ....... H04L 63/1441
2018/0013724 A1 * 1/2018 Row ..................... H04W 76/10
2018/0176176 A1 * 6/2018 Kapur ................. H04L 61/4511
2018/0302770 A1 * 10/2018 Bhaskaran ............ H04W 76/14
2018/0331903 A1 * 11/2018 Bogner ................. H04L 67/141
2019/0058694 A1 * 2/2019 Hussain .............. H04L 12/4641
2019/0132291 A1 * 5/2019 Zhao ................... G06F 9/45558
2019/0173849 A1 * 6/2019 Lapidous ................ H04L 67/56
2019/0190891 A1 * 6/2019 Pillai ................... H04L 63/0428
2019/0199822 A1 * 6/2019 Desbureaux ............ H04L 63/10
2019/0215308 A1 * 7/2019 Feyzibehnagh ..... H04L 63/0428
2019/0238504 A1 * 8/2019 Gupta ................. H04L 61/4511
2019/0238536 A1 * 8/2019 Chilla ................. H04L 63/0823
2019/0334864 A1 * 10/2019 Yin ..................... H04L 63/0272
2020/0196101 A1 * 6/2020 Edge ..................... H04W 12/06
2020/0259795 A1 * 8/2020 Koshal .................. H04L 41/083
2024/0291820 A1 * 8/2024 Maan .................. H04L 63/0227

OTHER PUBLICATIONS

Gont; RFC 7359; 2014; retrieved from the Internet https://www.rfc-editor.org/rfc/pdfrfc/rfc7359.txt.pdf; pp. 1-12. (Year: 2014).*
No stated author; Cisco Firewall VPN 'Hair Pinning'; 2014; Retrieved from the Internet https://web.archive.org/web/20180803162058/https://www.petenetlive.com/KB/Article/0000040; pp. 1-7 as printed. (Year: 2014).*
Dkramer; Unable to Access External IP Addy; 2006; retrieved from the Internet https://community.sophos.com/utm-firewall/f/network-protection-firewall-nat-qos-ips/38096/unable-to-access-external-ip-addy-from-internal-network---very-confused; pp. 1-3, as printed. (Year: 2006).*
Kaufman et al.; RFC 5996—Internet Key Exchange Protocol Version 2 (IKEv2); 2010; retrieved from the Internet https://datatracker.ietf.org/doc/html/rfc5996; pp. 1-138, as printed. (Year: 2010).*
United Kingdom Patent Application No. 2004127.3, Examination Report, dated Nov. 10, 2021, 3 pages.
International Patent Application No. PCT/GB2020/000031, International Search Report and Written Opinion, dated May 13, 2020.
United Kingdom Patent Application No. 1904224.1, Search Report, dated Nov. 27, 2019.
United Kingdom Patent Application No. 2004127.3, Combined Search and Examination Report, dated Sep. 17, 2020.

* cited by examiner

NETWORK FILTER

This invention relates to a network filter, in particular a network filter for enabling a secure data transfer over a network between network participants.

It is well known to use a public network to connect two or more remote users. In this arrangement traffic flows between these two hosts and passes through shared resources e.g. routers, switches and other network equipment. It is therefore essential to secure the communication route across which the data traffic traverses. This can be achieved by creating a VPN tunnel that can only be formed when specified criteria are met and which may utilise security associations and key distribution techniques.

Network protocols define the rules and conventions for communication between network devices. The majority of network protocols can be characterised as the exchange of a series of outbound and inbound packets (where outbound and inbound is from the perspective of the initiator of the packet exchange). Protocol and protocol stage identification can be performed by a mixture of port (for UDP and TCP based protocol), payload content (or features of the payload) or other characteristics based on the underlying protocols.

A device, for example a laptop, often needs to connect to multiple services, but for best security must never connect to more than one service at a time or within a session. It is known to use a blacklist or whitelist to prevent a device from connecting with a specified service. Restrictions on connection to services can be implemented in software or in complex (and expensive) hardware forms. As an example, firewalls in whitelist mode are preconfigured to permit "predetermined" protocols (usually denoted by TCP/UDP port) to connect to hosts from enumerated endpoints (i.e. a finite list of addresses). In blacklist mode, the firewall allows all protocols to all IP ports except those specifically prohibited on the basis of TCP port and IP addresses. Firewalls effectively create a boundary between a trusted network and the rest of the world and are beneficial in reducing the attack surface available to hackers and malware. However, the first generation of firewalls that focused on asserting ports and protocols have now evolved into new generation firewalls which set criteria for applications and users.

As an example, Deep Packet Inspection (DPI) assures that the traffic in e.g. port 80 is actually http. The data traffic is allowed (or blocked) based on a default configuration. Whilst this technique enables threats inside the content of the data traffic to be identified such modern firewalls can be difficult to operate and manage due to their complexity.

Another feature of DPI and similar later generation devices is that they are centralised enterprise appliances and a client must somehow obtain a connection to the facility before they can obtain the benefit of these appliances.

Even with the use of a firewall (be it first generation or more modern versions) there is still the potential for weaknesses in their implementation.

The client that attaches to the enterprise site will be for a period exposed to the transport network, which is frequently the internet. Protecting the client from malicious actors on the internet is delegated to software-based products that act as firewalls. As software requires management and support this pushes a security control that is centrally managed to the edge of the enterprise with the net result that when it is most vulnerable it is least managed.

Therefore, embodiments of the present invention are intended to address at least some of the above described problems and desires. In particular there is a desire to ensure that there is a reliable and reproducible means of creating a VPN connection which has improved security characteristics compared to existing techniques and is cost effective to use and manage.

According to a first aspect of the invention there is provided a method of creating a network data pathway via a network filter comprising:

a selection phase and an operation phase, the selection phase comprising:

transferring over a network at least one enquiry data packet between a first network participant and at least one other network participant via the filter;

receiving at least one enquiry data packet response from the at least one network participant via the filter, selecting at least one network participant so as to switch from the selection phase to the operation phase, the operation phase comprising creating a network data pathway between the first network participant and the at least one selected network participant and prohibiting further creation of a network data pathway between the first network participant and any unselected other network participant.

For the avoidance of doubt the first network participant may be considered to be the first network user or the entity client (who is positioned on the client-side of a network boundary). It should be noted that the invention is not to be limited to a client-side network device, but this is a common implementation of the network filter.

The method therefore prevents enquiry packets and operational packets from being transferred along the network to any unselected other network participants. The selection phase could be considered to be a pairing phase whereby it is established which users of the network are to be paired via a communications link along a network. Similarly, this selection phase can be thought of as the establishment state.

'Switch from the selection phase to the operation phase' means triggering the operation phase on selection of the at least one network participant and causing the method state of the filter to transfer from the selection phase to the operation phase.

The request need not comprise a preamble of any kind (for example it may be DNS), or alternatively the request may comprise some element of negotiation, for example VPN is UDP which is connectionless and thereby does not possess any transport level negotiation, but does possess session level negotiation i.e. the IKE_SA_INIT_request. Alternatively, TCP is at the transport level, so in this example there is potentially a TCP handshake and then a TLS negotiation.

The first network participant is something that produces a packet e.g. a network stack or computer executable software which is to be distributed as an enquiry to other network participants.

The enquiry data packet is a connection request which is forwarded to other network participants. The enquiry data packet is provided by the first network participant who is considered to be the network communication pathway initiator. The network initiator can be said to be acting on behalf of, or under the control of a natural person or a virtual entity.

The other network participant means a network participant at a different node of the network to the first network user e.g. a further VPN participant. This network participant can be said to be acting on behalf of a natural person operating a computing device, or a virtual person/entity in the form of a programmable device. The other network participant could alternatively be considered to be a network destination differing to that of the user.

In a first embodiment, only a single network participant is selected and only a single network data pathway is created between the first network user and the selected network participant. The network participant is a single network host. However, in an alternative embodiment of the invention, multiple network participants may be selected if desired provided the traffic across each pathway is of a different type.

In its simplest manifestation the method provides exclusivity of service in a more secure way. Further, there can be provided a sequenced exclusivity of services, for example a user can be communicatively coupled directly between a node A to a node C to enable data transfer from node A to node C, but when data has been transferred to node C, the data can never be directed back towards node A again. By increasing the chain of events, a user can transfer data directly from node A to node B (and prevent a transfer of data from node B to node A) and then subsequently transfer data from node B to node C (but prevent a transfer of data from node C to node B).

The benefit of this arrangement is that the filter permits nothing to pass through except the enquiry parts of the protocol (to any network user) at the selection phase and then only the operation parts to the sole partner selected, thereby ensuring exclusivity of the transfer of information in the operation state.

This ensures that in the operation state, for example where a VPN tunnel is created, data traffic is permitted to pass between the user and the selected VPN participant (and vice versa) so as to provide exclusivity of data traffic over the filter between the user and the selected VPN participant. The network data pathway is an exclusive data pathway across the network and (for the VPN case) can be considered to comprise a VPN tunnel, at least part of which passes through the filter.

The selection of the network participant may occur independently of any determination of the trust status of the other network participant. This means that the selection of the network participant may occur irrespective of any trust status of the network participant. Beneficially, selection of the network participant may occur prior to or in absence from establishing a trust status of the network participant. The invention does not intend to give any consideration about trust of the host at the endpoint. Instead, the filter and method are configured to prohibit untrusted and trusted endpoints to meet on/be visible to the client at the same time and that is what it stops.

The network participant may provide the first data packet response to be received by the first network participant is selected.

The at least one selected network participant may be selected in dependence upon a predetermined protocol sequence.

Preferably, passage of the at least one enquiry data response from a network participant, via the filter, may be permitted in dependence upon predetermined selection criteria. Therefore, the at least one selected network participant may be chosen in dependence upon predetermined selection criteria. To enable this the method may comprise inspection of the at least one enquiry data packet response to identify compliance of the predetermined selection criteria.

The selection criteria may comprise any one of a combination of responses from i) a predetermined recipient, or ii) at least one of a predetermined set of response types.

For the criteria ii) 'the response type criteria' may be one or more features of i) the packet type itself, ii) adherence with the expected version of the protocol; or iii) compatibility of the response with the enquiry.

The predetermined recipient is a predetermined at least one other network participant (i.e. a network user who is not the first network user).

At the selection phase (when the enquiries are distributed and regardless of the protocol) the return channel is available to enable the responses to be passed across the filter. The selection phase can also be considered a pairing phase.

In reality this is an enumerated range of responses, for example for VPN, this may be a positive or a negative response to proceed. It is noted that a negative response is actually a valid response even though it would dissuade selection by the first network user.

There are however, examples of invalid responses which would be a failure of a selection criteria list above, for example an incompatible response to a VPN request.

The at least one selected network participant may be selected dependent upon the first enquiry data packet response received by the network user. This provides a 'first dibs' approach whereby the network pathway is created once the first network user receives a valid response from a network participant.

In the operation phase, data transfer or packet transfer along the data pathway between the first network user and the selected participant and vice versa may be exclusive i.e. transfer of data may be permitted solely between the user and the at least one selected network participant.

The selection of the at least one participant may be implemented at the IP packet layer. This provides increased security ensuring undesired data transfer is prohibited.

Prior to sending an enquiry a specific IP address may be determined for a predetermined at least one selected network participant. This enables an enquiry packet to be directed towards a known, trusted network participant. The enquiry packet response would enable a communications pathway to be created, provided the response received is valid i.e. satisfies the criteria.

In the selection phase the at least one enquiry may require DNS resolution of the at least one network participants IP address.

The DNS resolution may be performed by permitting communication with at least one DNS server.

In the operation phase all DNS queries may be directed to the at least one selected network participant.

On creation of, for example a VPN tunnel subsequent DNS enquiry may be prohibited. It is noted that whilst it is a VPN tunnel that is being created, the filter in principle is not aware that it is a VPN per se being created, all the filter is aware of is that once the communications pathway has been set up, it is no longer possible to go back to the DNS enquiry state.

The operation phase may comprise a cool-down period wherein creation of a further network data pathway between the network user and any unselected network participant is prohibited.

On expiry of the cool-down period, the operation phase may revert back to the selection phase.

The cool-down period state may be terminated by the receipt of a signal from the first network user.

In the method, there may be provided a first data traffic type and a second data traffic type, wherein the first data traffic type is forwarded along a first data pathway and the second traffic type is forwarded along a second data traffic pathway.

The packets may comprise one or more specific protocol types to be transmitted.

There may be provided a first protocol type prior to receipt of the enquiry data packet response and a second protocol type subsequent to receipt of the enquiry data packet response.

The second protocol type may comprise i) a new protocol differing to the first protocol type, ii) a combination of new protocol stage and iii) new protocol, or an entirely new protocol stage.

The creation of a further network data pathway between the first network user and any unselected network participants may be dependent upon a further specified protocol criteria.

This feature thereby enables the first network user to connect to other users in a trusted network e.g. offers an open filter that permits pathways to be created between the user's computer and a series of peripheral devices such as printers which are located on the same trusted network. These devices may be configured to have similar IP ranges. It is noted that in this embodiment, the method still only permits a single network pathway to be created between the user in the trusted network with a selected network participant in a lesser trusted network, so as to offer an exclusive pathway per protocol.

The selection phase and the operation phase may be a single step process. For example, this single step process would apply to DNS or other handshake less type protocols.

After the creation of a data pathway and on determination of a termination trigger the method may further comprise:

a. terminating the network data pathway;

b. rebooting compute associated with the first network participant; and c. reverting the method to the selection phase.

Whilst this reboot capability may be triggered in the case that the selected network participant is determined to be untrusted, it may also be implemented in other situations and rely on other trigger points, for example it may be applied when the first network participant has a bad client experience (such as when the session keeps dropping out). For the avoidance of doubt, the determination that the selected network participant is untrusted occurs subsequent to the network data pathway being created and is to be considered a termination trigger.

In an alternative embodiment of the invention there may be provided a network filter comprising:

at least one processing unit; and a computer-readable media comprising computer executable instructions, which when executed by the at least one processing unit causes the network filter to:

transfer at least one enquiry data packet between the network user and at least one other network participant;

permit receipt of at least one enquiry data packet response from the at least one network participant, select at least one network participant;

create a data communications pathway between the user and the at least one selected network participant; and prohibit the creation of a network data pathway between the first network user and any unselected network participant.

Further the network filter may be configured to create a network data pathway between the first network participant and the network participant providing the first data packet response to be received by the first network participant.

The computer executable instructions may specify a predetermined protocol sequence to be implemented.

Therefore, further enquiry packets are prohibited from being transferred along the network to any unselected network participants, since no further network data pathways are created.

The data pathway may be a secure VPN tunnel enabling a data connection between the user and the selected at least one participating network user.

The network filter may further comprise a timing means 8 for determining the cool-down period of the data communications pathway.

The data filter may further comprise a reset mechanism to revert the network filter back to the selection phase in the case that the timing means indicates that the predetermined cool-down period has been exceeded.

Alternatively, the reset mechanism may be activated by a termination trigger. The termination trigger may comprise a signal from the first network user, may occur on determination that the selected network user is untrusted or may occur when the first network user has had a bad client-side user experience.

The reset mechanism may be provided by software or may be a physical reset sufficient for specific applications.

The network filter may comprise a comparator 7 for comparing the enquiry data response in dependence upon predetermined selection criteria and for outputting comparison output.

There may also be provided a processor for configuring the passage or for blocking the enquiry data response in dependence upon the comparison output.

The filter may be configured to select the other network participant independently of any determination of the trust status of the other network participant. This means that both trusted and untrusted other network participants are in the pool of other network participants that receive the enquiry data packets issued by the first network participant. More particularly, a data pathway may be established between any of:

i. the first network participant and a trusted other network participant;

ii. the first network participant and an untrusted other network participant;

iii. the first network participant and an other network participant where the trust status is undetermined; or iv. the first network participant and an other network participant where the trust status is indeterminable.

In a further embodiment of the invention there is provided an electronic device comprising a network filter as hereinbefore described.

In a further embodiment of the invention there may be provided a server comprising a network filter as hereinbefore described.

In a further embodiment of the invention there may be provided a network gateway comprising a network filter as hereinbefore described. The network gateway may form part of a hardware component or may be software based.

In a further embodiment of the invention there may be provided a network comprising a network filter as hereinbefore described.

Whilst the invention has been described above it extends to any inventive combination of the features set out above, or in the following description, drawings or claims. For example, any features described in relation to any one aspect of the invention is understood to be disclosed also in relation to any other aspect of the invention.

The invention will now be described, by way of example only, with reference to the accompanying drawings, in which:—

FIG. 1*a* shows a schematic of a selection phase of the method of the invention;

FIG. 1*b* shows a schematic of the operation phase of the method of the invention;

Figure 5A:
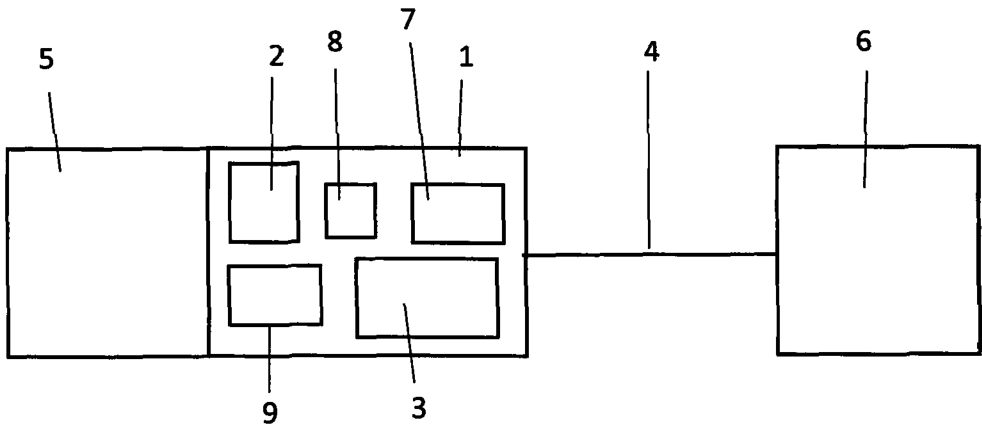
Figure 5B:
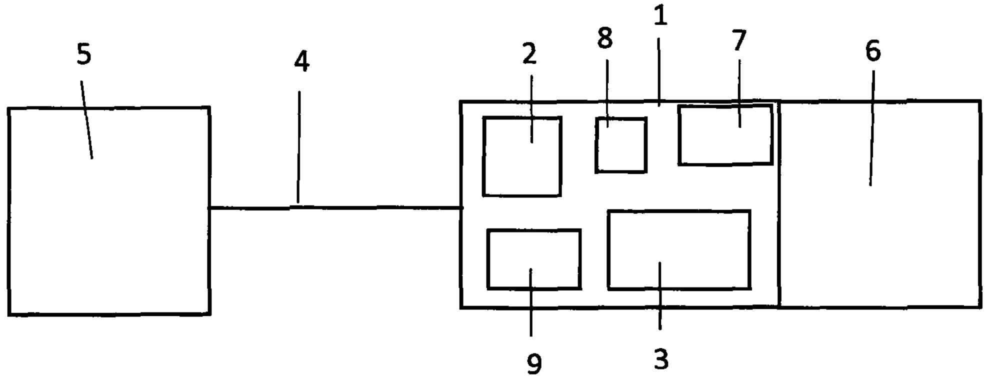
Figure 5C:
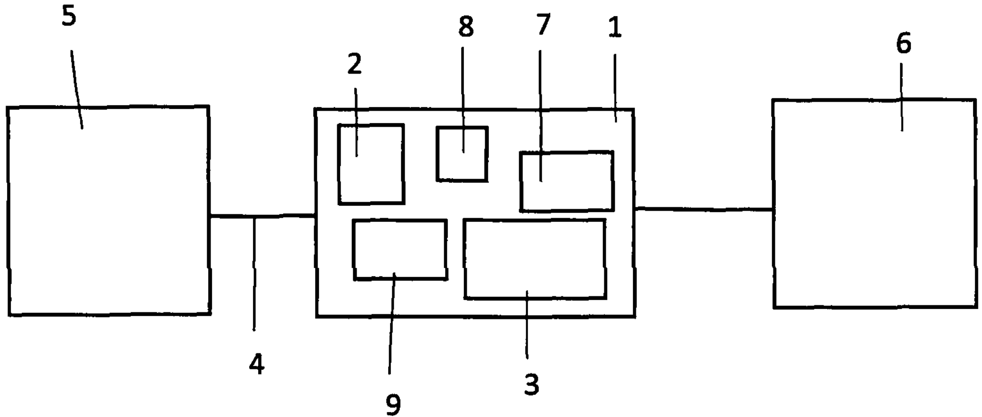

FIG. 5*a* shows a schematic of a network filter according to the invention;

FIG. 5*b* shows a schematic of an alternative network filter arrangement according to the invention; and FIG. 5*c* shows a schematic of yet a further alternative network filter arrangement according to the invention.

Figure 1A:
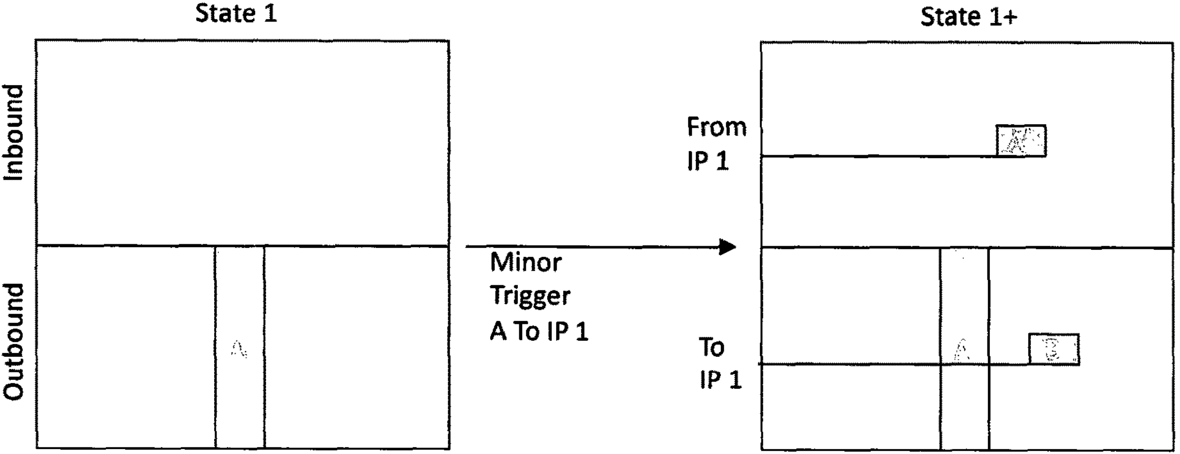
Figure 1B:
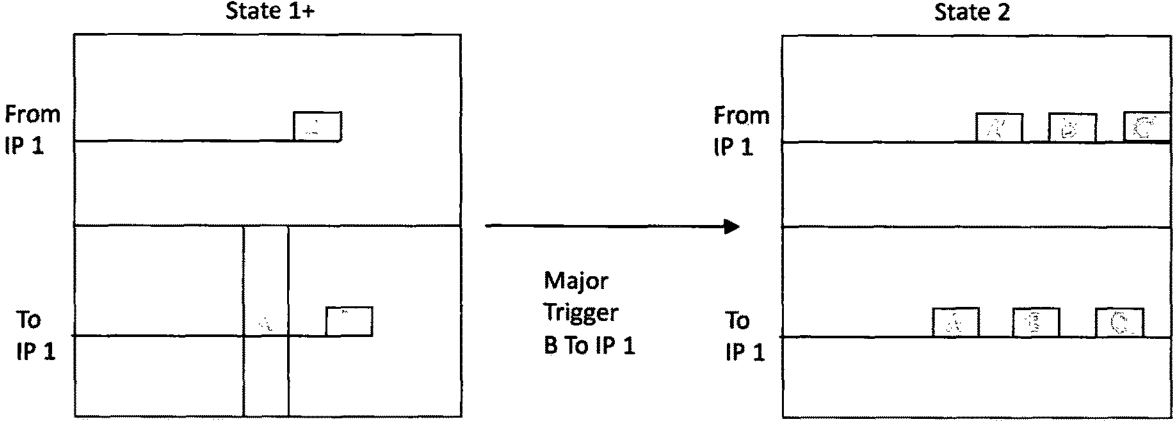

In FIGS. 1*a* and 1*b* there is shown the method steps of a hardware enforcing selective network filter according to the invention. The filter inspects data traffic to enable automatic configuration of the filtering state machine. The network filter comprises two core states: a selection state (state 1) and an operation state (state 2). The selection state allows for the discovery of available data sharing participants e.g. hosts which are responsive to the user allowing for one of the hosts to be selected. In this initial state the filter allows packets comprising one or more specific protocol stages to be transmitted. The network filter is set up to inspect each packet for a trigger. The trigger is a specific type of protocol stage packet that alters the configuration of the filter.

As shown in FIG. 1*a* and FIG. 1*b*, there are two types of trigger event. A minor trigger event as shown in FIG. 1*a* switches the filter from a first state (state 1) to an incremented state (state 1+). In the first state the outbound packet A is sent to a network participant who the user could potentially connect with across the network. In the incremented state 1+ the network participant sends a response packet A'. If the response packet A' is permitted to pass through the filter, a second protocol stage B is then provided (or an entirely new protocol).

A major trigger event as shown in FIG. 1*b* changes the filter from the first state 1 or incremented initial state 1+ to a new second state (state 2).

The major trigger is the identification of a packet conforming to the protocol state B. In this example, this major trigger event enables the filter to create a network data pathway between the user and the selected network participant (i.e. the network participant that has generated a major trigger event). This major trigger event enables the switching of the filter from the selection state to the operation state. In the operation state, shown in FIG. 1*b*, protocol stages A, B and C are permitted (as are the return stages A', B' and C') but only between the user and selected network participant 1. Therefore, there is an exclusive network data pathway created between the user and the selected network participant.

State 2 (the operation phase) is configured to time out and revert back to state 1 (the selection phase) if inactivity is experienced for a predetermined period of time.

The selected network participant can also be described as a prime participant. Once the filter has picked a prime participant it then switches to the operation phase where it prohibits any connection to any other participant during operation. As an alternative, after operation ends the filter enters a cool-down period (of a predetermined time duration) during which the filter can reconnect with the prime participant, but with no other (unselected) participant and indeed nothing else. The cool-down period could be infinite (requiring the power cycle to start again in order for a reset of the device). Alternatively, the cool-down period may be finite, in which case at the end of the cool-down period the filter can be set up to reboot and allow for re-selection of a service (which may be the same as previous or may be completely different). As a further alternative, there can be provided a two-stage cool down comprising a first stage where the filter is configured in a waiting mode and a second stage where the filter resets. A trigger packet may be provided to cause transfer of the filter between the first state to the second state.

Cool-down will be implemented as soon as the filter stops seeing packets being sent along the communication pathway established between the first user and the selected (and therefore permitted) network participant. As an example, for a cool-down period of 15 minutes, every time the filter sees permitted packets it re-starts the counter to determine when the connection was last used and when the clock times out). At the end of the prescribed time period the communications pathway is terminated, and the filter returns to state 1.

An alternative mechanism is when the protocol itself provides explicit teardown, for example TCP sockets are shutdown using a FIN/FIN-ACK/ACK sequence of packets, which the filter can interpret.

Cool-down will either occur as soon as it sees such a termination sequence or alternatively, state transition (e.g. from state 2 to state 1) may be enforced by receipt of a "magic packet".

In general, during the selection phase a first enquiry data packet is transferred between the user and the other participants via the filter. An acknowledgement to the first enquiry is provided by the participants via the filter and the enquiry data packet response is received by the user. In the example of VPN one of the VPN participants is selected and a packet is sent to that participant. This triggers the operational phase of the filter and an exclusive data pathway between the user and the selected recipient is created i.e. a VPN tunnel. In the operational phase further enquiry packets are prohibited from being sent by the other participants i.e. the participants that were not selected.

To expand on this example and in reference to FIG. 1, IKEv2 has 2 protocol stages during set up namely IKE_SA_INIT and IKE_AUTH. Protocol A corresponds to IKE_SA_INIT. Initially, the user has no restriction over what it tries to connect to with the initial IKE_SA_INIT request packet. These packets act as a minor trigger for State 1+ to update the filter to allow the IKE_SA_INIT response packets to get back to the user from these attempts.

An IKE_AUTH request (protocol B) to a specific IKE endpoint acts as a major trigger and moves to State 2 which is the operation phase. Once this operation phase is entered all IKE protocols stages are allowed, but only to the IP address that the IKE_AUTH request protocol packet was directed to. Therefore, previously allowed protocol A packets are now blocked.

Figure 2:
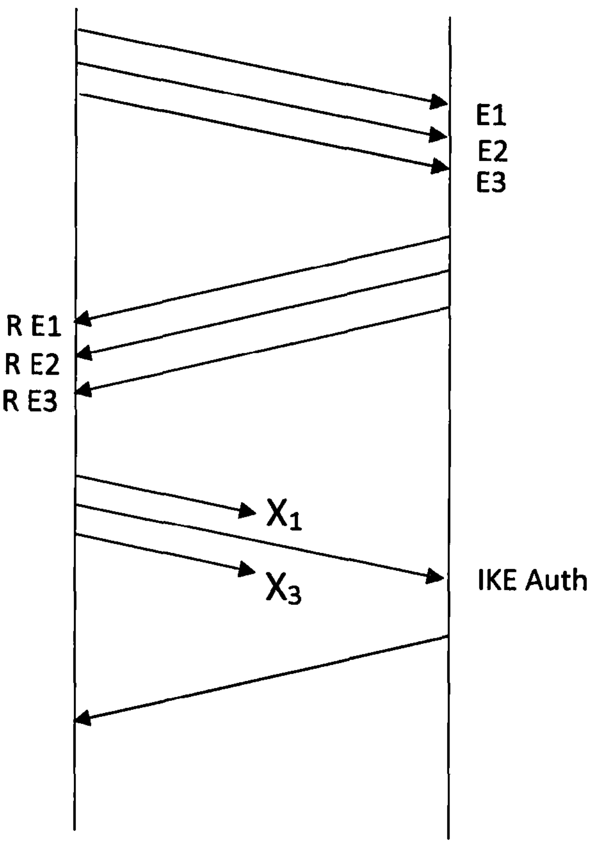
FIG. 2 shows a schematic of the secure network pathway creation method according to the invention.

In FIG. 2 three SYN messages are forwarded to three separate participants E1, E2 and E3 to create a TCP socket. All three recipients send an acknowledgement of the request (the SYN/ACK packet) which is received by the first network user. The first response to reach the first network user is from E2. As such the first network user selects E2 and sends an ACK packet and a TCP socket is thereby initiated. Any attempt to send information to E1 or E3 after this step will be to no avail i.e. the respective information channels are blocked. The first network user and selected network participant E2 are then free to transfer data across the data communication pathway and no other communications link can be created whilst the data communication pathway is in use. This is because the filter prevents any further pathways to be created between the first network user and any network participant who is not E2, and further prohibits the creation of any alternative network data pathway to E2. Therefore, the transfer of packet information (be it SYN Requests or another form) to any other participant is prohibited.

Effectively in this embodiment, the first permitted protocol is from the client to the external service e.g. public network or device connected to a public network.

Figure 3:
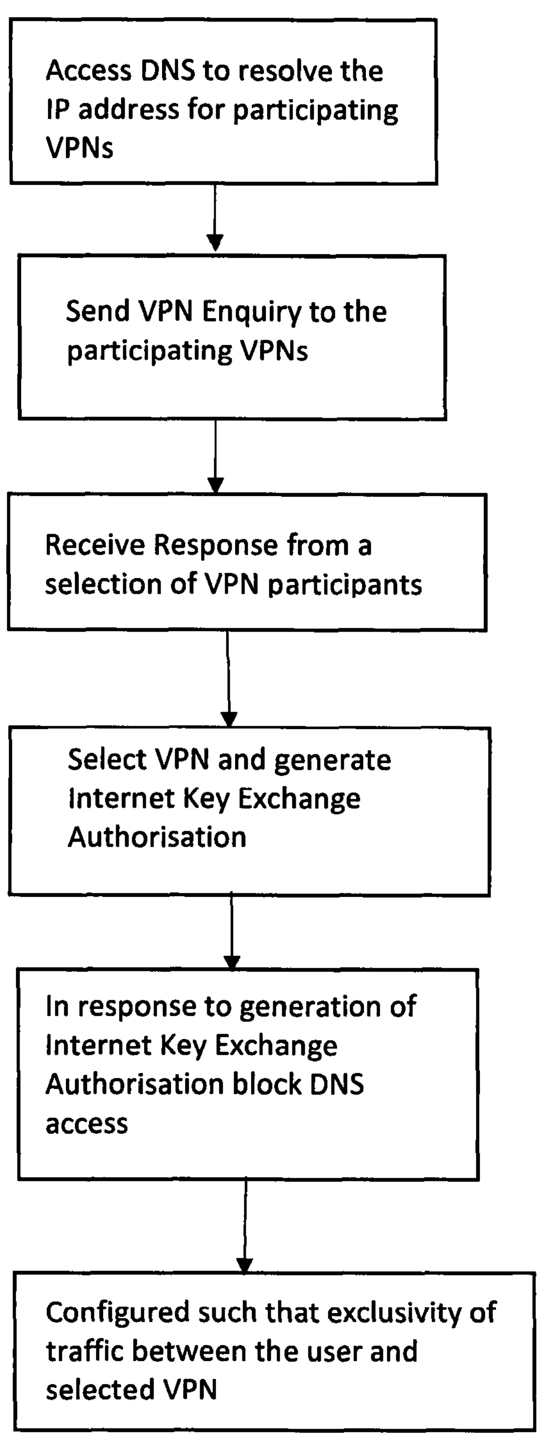
FIG. 3 shows a flow diagram of a VPN link embodiment of the method of the invention.

In an alternative embodiment of the invention as shown in FIG. 3, there is provided the addition of Dynamic Name System (DNS) giving three states as follows:

state 0—allows DNS until the filter identifies VPN initialisation, and allows VPN initialisation;

state 1—allows VPN Initialisation (but not DNS in this example) until the filter identifies VPN Authorisation;

state 2—locks exclusively to that VPN Authorised.

The filter allows a Domain Name system (DNS) request to any DNS server and receives a response from that server. Thereafter, all DNS queries must go to this server. The filter enters a latch state whereby, after the DNS query is resolved, the filter permits a VPN tunnel to be constructed through the filter. Once the VPN tunnel is constructed subsequent DNS queries are blocked. As mentioned previously, this can be extended to any number of protocols (including multiple steps of the same protocol).

The filter will, in this example, also allow immediate VPN for cached domain names of VPN endpoints that are identified by IP addresses.

For any handshake on a connection-based protocol or a protocol that expects a well-defined response, the following either individually or in combination can be used as criteria to determine data pathway exclusivity:

TCP socket—the incoming enquiry response to a SYN packet;

TCP socket—the outgoing response to a SYN-ACK packet; or

TLS session start up packets.

As shown in FIG. 3 a user wishes to create a VPN tunnel with a VPN participant that is described in the form of a fully qualified domain name. The user enters the known VPN information into the device e.g. a web address and the device contacts any DNS server to perform DNS resolution so as to determine the IP address associated with the VPN information. Many DNS servers exist and a combination of DNS servers in a network may be accessed. The enquiry may be forwarded to a selection of VPN participants all accessed by varying DNS servers. The VPN participants respond, and the user can select the preferred VPN participant to connect with. At this point the filter is initiating the internet key exchange and the device is able to operate as usual. Once the user selects the VPN participant that it wishes to connect with it responds with an internet key protocol authorisation. This selection is based on a 'first dibs' basis, alternatively the selection is based on automated selection criteria, for example based on information provided in the response packet, or positive selection by the user.

Once the VPN participant has been selected, all DNS queries are passed through the selected server. Therefore, the filter enters a latch state (identified previously as state 2 in FIG. 1). Only then will a VPN tunnel be constructed through the filter. Once the VPN tunnel has been constructed all subsequent DNS queries are blocked. This ensures that there is exclusivity along the network data pathway and no ability for an alternative pathway to be created. Therefore, the security to the VPN communications pathway is provided at the packet layer i.e. prior to the VPN tunnel being created. At the IP packet layer there is useful filtering information: TTL (time to live) and IP addresses. In particular, the criteria to be relied upon is highest TTL or closest IP match.

The above provides an indefinite lockout enabling only a single connection to be realised, or alternatively, encompasses a cool-down period for the exclusive connection. For example, if the VPN data transfer is inactive for a predetermined period of time, for example 1 hr, then the filter is reset and the filter reverts back to the selection phase whereby initial enquiries are made to a variety of DNS servers.

Whilst there is a concept of an allowed protocol (for example the first embodiment set to VPN based on port) there is no concept of a configured allowed address as per the firewall example mentioned earlier. In single protocol mode the filter is configured such that the first protocol to attempt to negotiate successfully has exclusivity over traffic over the filter.

The multiple states of the filter state machine can be configured in various geometries.

Figure 4:
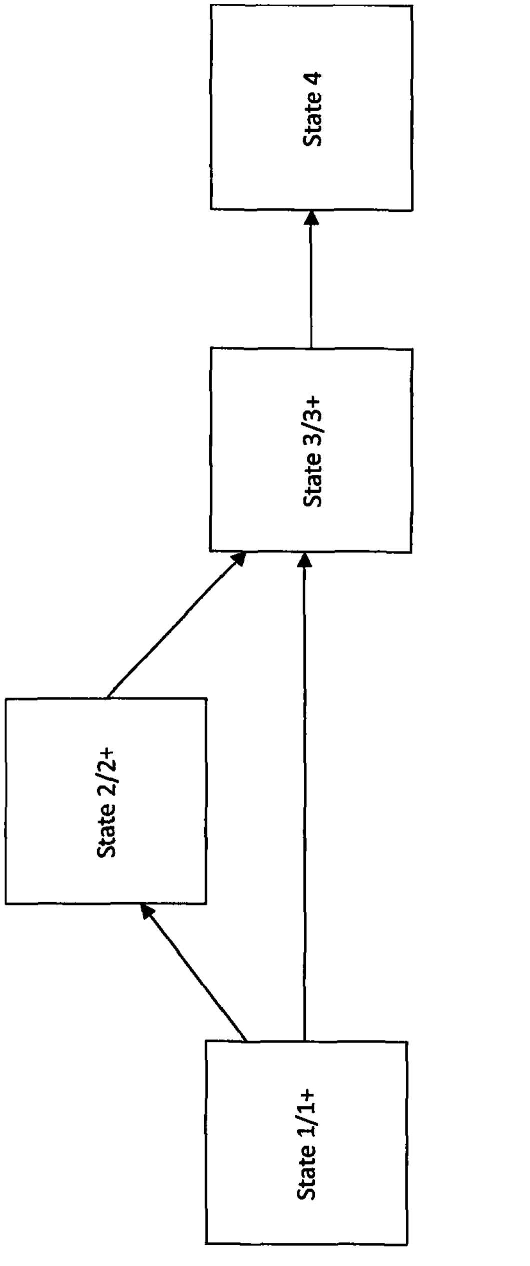
FIG. 4 shows a block diagram representation of a network filter method according to an alternative embodiment of the invention.

In an extended implementation as shown in FIG. 4, the first state may further allow for DNS look ups, https requests and Internet Key Exchange (IKE), but only in a specific order. A worked example is now described.

State 1 allows for universal DNS, Https and IKEv2;

Major triggers for state 1: Https and IKEv2 SA_INIT;

State 2 allows universal Https and IKEv2 SA_INIT;

Major trigger for state 2 is IKEv2 SA_INIT,

State 3 allows for universal IKEv2 SA_INIT, and IKE_Auth to enquired participants;

Major trigger for state 3 is IKE_AUTH request to the selected participant;

State 4: allows IKE (all protocols states) to only the selected participant in the major trigger from state 3;

Major trigger for state 4: none (requires hardware reset via a reset mechanism 9).

This enables the user to gather credentials of the participant before the filter sets up a VPN tunnel between the user and a second network participant. Once again this offers improved security over known firewall solutions.

The filter 1 comprises a processor 2, a memory 3 and a network communication means 4 which provides a network data pathway for network data. Other hardware or software logic controls are also implemented. The filter 1 is an interface between the electronic device 5 operated by the user (e.g. computer, tablets or mobile devices) and the network i.e. an external network host or node. The filter may be implemented at the electronic device end 5 (as shown in FIG. 5*a*), at the server end 6 (as shown in FIG. 5*b*) or intermediate the electronic device 5 and server 6 (as shown in FIG. 5*c*). The data pathway 4 may be wired or wireless. The electronic device end can also be referred to as the 'client-side'.

The filter is configured to select the other network participant independently of any determination of the trust status of the other network participant. To enable the enquiry response to be of the correct form, a comparator 7 is implemented for comparing the enquiry data with predetermined selection criteria and for outputting a comparison output. The output of the comparator 7 is used to determine the desired decision output so as to select whether the enquiry response should be permitted to pass through the filter or whether it should in fact be barred from passage across the data pathway of the filter. Therefore, passage of the enquiry data response is dependent upon the comparison output provided at the comparator 7.

A timing means 8, e.g. a clock is implemented for determining a cool-down period of the data communications pathway 4. As mentioned during the cool-down period, wherein creation of a further network data pathway between the first network participant (4) and any unselected other network participant is prohibited.

A reset mechanism 9 e.g. formed of a switching device be it mechanical or electrical is configured to revert the network filter 1 back to the selection phase in the case that the timing means 8 indicates that the predetermined cool-down period has been exceeded. Alternatively, the reset mechanism 9 reverts the network filter 1 back to the selection phase on receipt of a termination trigger.
The termination trigger can take many forms, but is usually a flag or other signal identifier provided at the client-side of the filter for example may be a signal from the first network participant 5 or as a result of the determination that the selected network participant 6 is untrusted or when a bad service is experienced.

There are therefore many manifestations of the invention. The requirement is for the filter to be implemented on a network card, as a software network filter, or as a firmware/hardware filter. So, the filter effect may optionally be provided as follows:

1) an embedded system running the filter in a software form (e.g. some sort of Linux based operating system on small form factor hardware)
2) a bump-in-the-wire running an FPGA;
3) a bump-in-the-wire running an ASIC;
4) a specialist network card with additional state machine firmware; or
5) a special network "switch" with one or more ports offering "by port" filtering to a native uplink portion.

The filter comprises a state machine e.g. the device comprises FPGA's or other well-known devices configured to create the required state machine effect. The filter 1 is integrated in the electronic device 5 or network server 6, however may alternatively be applied as a retrofittable device.

For this filter 1, the processing unit 2 must be something that has the speed that can "inspect" and either forward or reject packets based on the inspection.

Various modifications to the principles described above would suggest themselves to the skilled person. For example, whilst there has been described the use of this method for secure VPN connection whereby the first protocol to attempt to negotiate successfully has exclusivity over data traffic over the filter, this technique can be extended to any number of protocols (including multiple steps of the same protocol).

Further in an alternative embodiment of the invention more than one data traffic type can be allowed to be transferred to different end points e.g. a VPN may be permitted to be transferred to a first network participant (e.g. VPN participant) and HTTPS may be permitted to be transferred to a second network participant (e.g. a HTTPS participant) at the same time.

In a yet further embodiment of the invention it is envisaged that the method of the invention may be configured to permit the switching between protocols and exclusive filtration of these protocols. This is achieved by allowing the user to pick, for example DNS or VPN. In a first use case, the VPN could be initially selected thereby blocking DNS altogether. Alternatively, if the user picks DNS the filter can stay with DNS, or follow the standard route of DNS followed by VPN (with subsequent DNS access being blocked). This enables protocols to be enabled or disabled depending on the use of other protocols.

The examples have described the end point being the creation of VPN connection, but the skilled person would understand that the method is applicable to other end points requiring single or multiple protocols, for example a simple remote system, e.g. as part of an Internet Of Things (IOT) network, that uses Secure File Transfer Protocol (SFTP) (based on Secure Shell (SSH) using certificates) to periodically upload files using an appropriately configured filter to negotiate an exclusive connection to a single (of potentially many) authorised endpoint (as defined by an acceptable server certificate) for uploading of files. Here the simple remote system will resolve DNS to identify a connection endpoint; start the SSH authentication; check using Online Certificate Status Protocol (OCSP) that the server's certificate is valid; complete the SSH negotiation (or reject in the case of a bad certificate); and after a period of cool-down reset to the initial state.

Beneficially the filter does not need any management and doesn't constrain what the user connects to, but solely ensures that the user is only connected to one permitted type of service at any one time.

The filter differs from other such devices because whilst it has a concept of allowed protocol (e.g. set to VPN based on port and packet characteristics) it does not have a concept of a configured allowed address. As mentioned previously, the filter can operate on the principle of "first dibs" in that the first protocol to attempt to negotiate successfully has exclusivity over traffic over the filter (in a single protocol mode).

Referring to FIGS. 1*a* and 1*b*, optionally the second protocol state B may be an entirely new protocol, or a combination of a new protocol state and a new protocol, or a new protocol state.

Alternatively, in state 1 there may be multiple minor triggers allowed. Alternatively state 2 can permit new protocol or protocol stages in addition to allowing more stages of the initial protocol.

Alternatively, state 2 may persist until an intervention such as a hardware reset, or another major trigger is received. State 2 may also be subject to minor triggers.

Optionally major triggers do not have to be part of an externally directed protocol. Specific packet triggers detected by the filter can be used as a specific state changing mechanism without a specific destination.

In a yet alternative embodiment of the invention, the filter could be configured to insist on only a single usage of a selected network to remote network participants. For example, if the filter is configured for private IP networks there are reusable IP ranges 192.168.0.0 etc. that are private and do not propagate outside an organisation, for example a user has the option to print to a variety of printers in their trusted network. The filter could be configured to permit any packets to or from these addresses but to restrict any connection to non-private ranges to be on unique selected protocols only e.g. VPN. Therefore, the selection effect is based on additional protocol criteria that must be pre-set.

At state 1 we describe that the DNS enquiry is blocked once the VPN enquiry commences, however it is also envisaged as described in a second embodiment above that the DNS enquiry could continue until the communication pathway is created (i.e. a VPN link is created). Both embodiments are possible, and the filter can be configured to implement either embodiment as desired by the user. It is noted that the cool-down criteria may be dependent upon and determined by the specific protocol used.

Beneficially the method and network filter of the current application removes the need for a trusted remote host manager to undertake management duties of the VPN clients. Instead the invention of the current application works on a 'first dibs' basis i.e. the first VPN to connect out gets exclusivity resulting in the method and network filter protecting against mixing of e.g. nVPN sessions (and any other session without needing to know where the end points are).

The exclusivity is enough to manage the risk client side as long as the client is prohibited from connecting to other network participants between sessions. Once there has been hard coding of the predetermined protocol sequence, no further configuration is required.

There is therefore no need for the usual complexity of selecting and configuring the VPN endpoint so as to specify, select and authorise an appropriate VPN connection to the selected endpoint so as to minimise the risk of connecting to a tad' network. Such a process is usually undertaken at the server side due to admin/processing burden.

Indeed, the current invention need not select VPN protocols at all e.g. it is applicable for IOT implementation where there is no ability to do VPN, but where instead an ASIC may be utilised, and associated transmission/other protocols implemented for predetermined applications.

A network entity is known to have a trust status associated with it. The trust status may have various states ranging from a trusted state, an untrusted state or state where the trust status is indeterminate or indeterminable. The method and filter of the current invention is beneficial because there is no requirement to assess the trust status of the network participants. Whilst it is possible for there to be only a single other network participant, in many situations and applications of the invention there are in fact multiple participants, thereby providing a participant selection pool, each participant being capable of receiving the data enquiry from the first network participant. This participant pool will more often than not include both trusted and untrusted participants. There is not discrimination between these trusted and untrusted participants in the selection phase of the invention and the selection of the network participant occurs prior to establishing a trust status of the network participant or indeed without knowledge of the trust status i.e. when the trust station information is unknown. Ultimately the network selection of the other participant is blind to a trust status of the network participant options (the participants in the participant pool). It can therefore be understood that selection of the network participant occurs irrespective of any trust status associated with other network participants. As such there is no requirement for all possible other network participants to be trusted e.g. as is the case in a private network, which removes the need to undertake a trust status check for all possible other network participants.

The exclusion of this trust status check alleviates valuable processing power that is generally afforded to such trust status analysis, or white list or blacklist implementation. It can therefore be said that the filter selects the network participant from other network participants independently of their trust status. It is reiterated that the other network participant which successfully provides the first enquiry response to the first network participant will be selected as the selected network participant (regardless of its trust status).

In the case that a network pathway is created between the first network participant and selected network participant that is subsequently determined to be an untrusted entity, the network will not enable the creation of any further pathways with any further network participants. In the case that the network participant is determined to be untrusted then the compute at the first participant side (the client side) will be rebooted. Specifically, the following method steps are undertaken:

a. terminating the network data pathway;

b. rebooting compute associated with the first network participant; and c. reverting the method to the selection phase.

However, in an alternative embodiment of the invention no such subsequent trust status check need be undertaken and the termination step, rebooting step and reverting back to the selection phase step may be undertaken after each pathway has been created.

Ultimately, the separation of the current application achieves separation of the negotiation and selection control from the client side compute e.g. the Operating System. In contrast to other known methods of achieving client firewall functionality the method and filter of this application does not depend on any specifics of the client or require any degree of trust or reliance in the software on the client device to function correctly.

The invention claimed is:

1. A method of creating a network data pathway via a network filter comprising:

a selection phase, during which the network filter is in a selection state, and an operation phase, during which the network filter is in an operation state, the selection phase comprising:

transferring over a network at least one enquiry data packet between a first network participant and at least one other network participant of a plurality of other network participants via the filter;

receiving at least one enquiry data packet response from the at least one other network participant via the filter; and selecting, from the plurality of other network participants, a selected network participant of the plurality of other network participants so as to switch from the selection phase to the operation phase, wherein a network participant from the plurality of other network participants providing a first enquiry data packet response containing a specific protocol stage trigger packet to be received by the first network participant is selected as the selected network participant, and wherein the specific protocol stage trigger packet enables the switching of the network filter from the selection state to the operation state; and the operation phase comprising:

creating a network data pathway between the first network participant and the selected network participant and prohibiting further creation of a further network data pathway between the first network participant and any unselected other network participant; and wherein the first network participant is prohibited from transferring over the network any further enquiry data packets to any unselected network participants.

2. A method according to claim 1, wherein the selected network participant is selected in dependence upon a predetermined protocol sequence.

3. A method according to claim 1, wherein only a single network participant is selected as the selected network participant and only a single network data pathway is created between the first network participant and the selected network participant.

4. A method according to claim 1, wherein passage of the at least one enquiry data response from another network participant, via the filter, is permitted in dependence upon predetermined selection criteria.

5. A method according to claim 4, comprising inspecting at least one enquiry data packet response to identify compliance of the predetermined selection criteria.

6. A method according to claim 4, wherein the predetermined selection criteria comprises a response from a predetermined recipient and/or at least one of a predetermined set of response type criteria.

7. A method according to claim 6, wherein the response type criteria comprises one or more of the following:

a) a packet type, b) adherence with an expected version of a protocol; or c) compatibility of the response with respect to the enquiry.

8. A method according to claim 1, wherein in the operation phase the data transfer or packet transfer along the network data pathway between the first network participant and the selected network participant and vice versa is exclusive.

9. A method according to claim 1, wherein the selection of the other network participant to provide the selected network participant is implemented at an IP packet layer.

10. A method according to claim 1, wherein prior to sending an enquiry data packet, a specific IP address is determined for a predetermined at least one other network participant.

11. A method according to claim 10, wherein in the selection phase the at least one enquiry requires DNS resolution of the IP address of the at least one other network participant.

12. A method according to claim 11, wherein the DNS resolution is performed by permitting communication with at least one DNS server.

13. A method according to claim 11, wherein in the operation phase all DNS queries are directed to the selected network participant.

14. A method according to claim 11, wherein on creation of a network data pathway subsequent DNS enquiries are prohibited.

15. A method according to claim 1, wherein the network data pathway comprises a VPN tunnel at least part of which passes through the filter.

16. A method according to claim 1, wherein the operation phase comprises a cool-down period wherein creation of a further network data pathway between the first network participant and any unselected other network participant is prohibited.

17. A method according to claim 16, wherein on expiry of the cool-down period, the filter reverts back to the selection phase from the operation phase.

18. A method according to claim 16, wherein the cool-down period is terminated by the receipt of a signal from the first network participant.

19. A method according to claim 1, wherein in the operation phase there is provided a first data traffic type and a second data traffic type, wherein the filter is configured to permit the first data traffic type to be forwarded along a first data pathway and the second data traffic type to be forwarded along a second data pathway.

20. A method according to claim 1, wherein the enquiry data packets comprise information concerning the one or more specific protocol types to be transmitted between the first network participant and the selected network participant.

21. A method according to claim 20, wherein there is provided a first protocol type prior to receipt of the enquiry data packet response and a second protocol type subsequent to receipt of the enquiry data packet response.

22. A method according to claim 21, wherein the second protocol type comprises a new protocol differing to the first protocol type, a combination of new protocol stage and new protocol, or an entirely new protocol stage.

23. A method according to claim 1, wherein creation of a further network data pathway between the first network participant and any unselected network participants is dependent upon a further specified protocol criteria.

24. A method according to claim 1, wherein after the creation of a data pathway and on determination of a termination trigger, the method further comprises:

a. terminating the network data pathway;

b. rebooting compute associated with the first network participant;

and c. reverting the method to the selection phase.

25. A method according to claim 24, wherein the termination trigger comprises the selected network participant being determined to be an untrusted network participant.

26. A method according to claim 1, wherein selection of the selected network participant occurs independently of any determination of an untrusted state or an indeterminable state of the selected network participant.

27. A network filter comprising:

at least one processing unit; and a computer-readable media comprising computer executable instructions, which when executed by the at least one processing unit causes the network filter to:

operate in a selection state during a selection phase and an operation state during an operation phase;

transfer, during the selection phase, at least one enquiry data packet between a first network participant and at least one other network participant of a plurality of other network participants;

permit receipt, during the selection phase, of at least one enquiry data packet response from the at least one other network participant;

select, during the selection phase, from the plurality of network participants, a selected network participant so as to switch from the selection phase to the operation phase, wherein the selected network participant is the network participant from the plurality of the network participants that provides a first enquiry data packet response containing a specific protocol stage trigger packet, and wherein the specific protocol stage trigger packet enables the switching of the network filter from the selection state to the operation state;

create, during the operation phase, a network data pathway between the first network participant and the selected network participant;

prohibit, during the operation phase, further creation of a further network data pathway between the first network participant and any unselected network participant; and prohibit, during the operation phase, the first network participant from transferring over the network any further enquiry data packets to any unselected network participants.

28. A network filter according to claim 27, further configured to create a network data pathway between the first network participant and the other network participant providing a first data packet response to be received by the first network participant.

29. A network filter according to claim 27, wherein the computer executable instructions specify a predetermined protocol sequence to be implemented.

30. A network filter according to claim 27, wherein the network data pathway comprises a secure VPN tunnel enabling a data connection between the first network participant and the selected network participant.

31. A network filter according to claim 27, comprising a timing means for determining a cool-down period of the network data pathway.

32. A network filter according to claim 31, comprising a reset mechanism to revert the network filter back to a selection phase in the case that the timing means indicates that the predetermined cool-down period has been exceeded.

33. A network filter according to claim 31, comprising a reset mechanism to revert the network filter back to a selection phase on receipt of a termination trigger.

34. A network filter according to claim 33, wherein the termination trigger comprises a signal from the first network participant or determination that the selected network participant is untrusted.

35. A network filter according to claim 27, comprising a comparator for comparing the enquiry data with predetermined selection criteria and for outputting a comparison output.

36. A network filter according to claim 35, wherein the computer executable instructions are further executable by the at least one processing unit to cause the network filter to:

configure the passage or block the enquiry data response in dependence upon the comparison output.

37. An electronic device comprising a network filter according to claim 27.

38. A server comprising a network filter according to claim 27.

39. A network communications gateway comprising a network filter according to claim 27.

40. A network comprising a network filter according to claim 27.

* * * * *